United States Patent Office 3,256,275
Patented June 14, 1966

3,256,275
PHTHALOCYANINE DYES
Arnold Tartter, Lambsheim, Pfalz, Hans Ruprecht Hensel, Heidelberg, and Fritz Graser, Ludwigshafen (Rhine), Germany, assignors to Badische Anilin- & Soda-Fabrik Aktiengesellschaft, Ludwigshafen (Rhine), Germany
No Drawing. Filed Feb. 13, 1962, Ser. No. 172,862
Claims priority, application Germany, Feb. 16, 1961, B 61,290
5 Claims. (Cl. 260—242)

This invention relates to new dyes which contain in the molecule at least once a radical of the formula:

$$-D-N(R)-A-N\underset{\underset{X}{\overset{\|}{O}}}{\overset{N=}{\diagup}}-Y \qquad (I)$$

in which D denotes a $-SO_2-$ or $-CO-$ group, R a hydrogen atom, a low molecular weight alkyl radical, a cycloalkyl radical, an aralkyl radical or an aryl radical, A denotes a low molecular weight alkylene radical with two to six carbon atoms in the chain, X denotes a chlorine or bromine atom and Y denotes a chlorine or bromine atom.

The invention also relates to a process for the production of these dyes.

It is an object of the present invention to provide dyes which yield outstandingly fast dyeings on a great variety of textile materials, especially when dyeing under alkaline conditions on cellulosic textile materials. The dyeings on cellulose are distinguished by good light fastness and especially by outstanding fastness to washing.

The dyes according to this invention, which contain at least once in the molecule a derivative of the dihalopyridazone of the general formula:

$$-D-N(R)-A-N\diagup\overset{N=CH}{\underset{\underset{X}{\overset{\|}{O}}}{\diagdown C-C}}\diagdown C-Y \qquad (I)$$

in which D, R, A, X and Y have the meanings given above, are obtained when acid halides of dyes or dye precursors are reacted with amines of the general formula:

$$HN(R)-A-N\diagup\overset{N=CH}{\underset{\underset{X}{\overset{\|}{O}}}{\diagdown C-C}}\diagdown C-Y \qquad (II)$$

in which R, A, X and Y have the meanings given above, or with amines of the corresponding open-chain hydrazone compounds of the general formula:

$$HN(R)-A-NH-N=CH-C(Y)=C(X)-COOH \qquad (III)$$

in which R, A, X and Y have the meanings given above, at 0° to 80° C. in a solvent or diluent, preferably with an addition of an acid-binding agent, and any hydrazone derivatives formed as intermediates are cyclized to dihalopyridazone compounds by heating, preferably in the presence of acids or acid-reacting compounds, or when dyes or dye precursors which contain at least once the radical of the general formula:

$$-D-N(R)-A-NH-NH_2 \qquad (IV)$$

in which D, R and A have the meanings given above are reacted with mucohalic acids at 0° to 100° C., preferably in the presence of acids or acid-reacting compounds, and any hydrazones formed as intermediates are cyclized direct in the reaction mixture or after isolation to the dihalopyridazone derivatives and, when dye precursors have been used, completing the formation of the dyes before or after cyclization.

The amides of the following compounds are examples of radicals of the Formula IV: aminoethylhydrazine, aminopropylhydrazine, aminoisopropylhydrazine, aminoisobutylhydrazine, aminohexylhydrazine, N-methylaminoethylhydrazine, N-ethylaminoethylhydrazine, N-cyclohexylaminoethylhydrazine and phenylaminoethylhydrazine.

Of the said amides, those are preferred which have on the amido nitrogen a hydrogen atom or a low molecular weight alkyl radical, especially an alkyl radical with one to six carbon atoms.

In the dyes according to this invention which contain at least once the radical of the general Formula I, R may accordingly be, for example, a methyl, ethyl, cyclohexyl or phenyl radical, but is preferably a hydrogen atom, and A is for example an ethylene, propylene, isopropylene, isobutylene or hexylene radical, preferably an ethylene radical.

The dyes containing the radical of the general Formula I may belong to a great variety of dye classes and may be derived for example from dyes of the anthraquinone, oxazine, tetrazaporphin or azo series. Dye precursors containing the radical of the general Formula I are for example monocyclic or bicyclic diazo or coupling components.

Acid halides used for the process are obtainable by conventional methods, for example from the corresponding sulfonic acids or carboxylic acids or from dyes free from sulfonic acid groups. In the case of dyes which contain more than one acid halide group in the molecule, all or only some of the acid halide groups may be reacted according to the invention and the unreacted acid halide groups, preferably sulfonic acid halide groups, saponified to the acid groups. To prepare dyes still containing free sulfonic acid groups it is also possible to start from compounds containing sulfonic acid groups as well as sulfonic acid halide groups. Suitable acid halides are carboxylic acid halides and especially sulfonic acid halides, such as sulfonic acid bromides and above all sulfonic acid chlorides.

Amines of the general formulae:

$$HN(R)-A-N\diagup\overset{N=CH}{\underset{\underset{X}{\overset{\|}{O}}}{\diagdown C-C}}\diagdown C-Y \quad \text{or} \quad HN(R)-A-NH-N=CH-C(Y)=C(X)-COOH$$

(II)                            (III)

in which R, A, X and Y have the meanings given above are obtained by the reaction of aminoalkylhydrazines with mucohalic acids and, if necessary, simultaneous or subsequent cyclization of the hydrazones first formed.

Dyes or dye precursors containing aminoalkylhydrazine groups of the general Formula IV may be obtained by reaction of dyes or dye precursors containing acid halide groups with amines of the formula:

$$HN(R)-A-NH-NH_2$$

in which R and A have the meanings given above and in which the hydrazino group advantageously is protected for example by an alkylidene radical, in a solvent or diluent at about 0° to 90° C., preferably at 0° to 30° C., if necessary with the addition of an acid-binding agent. They are converted into hydrazones with mucohalic acids, such as mucochloric acid or mucobromic acid, in aqueous solution or suspension or in organic solvents at room temperature or elevated temperature, for example, at 50° to 100° C.

Cyclization of the hydrazones to pyridazones is preferably effected with mineral acids which are used either in anhydrous form or as dilute aqueous solutions. If the cyclization is carried out with dilute aqueous mineral acids, for example with dilute sulfuric acid or dilute hydrochloric acid, it is advantageous to work at higher temperatures, for example, at 60° C., up to the boiling point of the mineral acid mixture. When using anhydrous acids or concentrated aqueous acids, for example, 96% sulfuric acid, cyclization proceeds at an adequate rate even at room temperature or moderately raised temperature. If reaction of the sulfonic acid hydrazinoalkylamides with mucohalic acids is carried out in mineral acid solution at an elevated temperature, for example, at 70° to 100° C., the halogenpyridazone derivatives of the dyes or dye precursors form directly.

Cyclization of the carboxylic acid hydrazinoalkylamides to the corresponding pyridazones is carried out in concentrated acid, such as concentratice sulfuric acid, or in glacial acetic acid, in order to avoid saponification of the carboxylic acid amide group.

When starting from dye precursors, either the dye precursor which already contains a group of the general Formula I is completed to the dye, or the dye is completed at a previous reaction stage of the group of the general Formula I. Halopyridazone derivatives of dye precursors are for example diazo components or their precursors, such as the coresponding nitro and acylamino compounds which can be converted into the diazo components by reduction or saponification, for example halopyridazonealkylamides of aminobenzenesulfonic acids or aminonaphthalenesulfonic acids, such as 1-aminobenzene-2-, -3- or -4- sulfonic acid, 1-aminobenzene-3,5-, -2,4- or -2,5-disulfonic acids, 1-amino-2-methylbenzene -4,5- or -4,6-disulfonic acids, 1-amino-3-chlorobenzene-6-sulfonic acid, 1-amino-2,5-dichlorobenzene-4-sulfonic acid, 1-aminonaphthalene-5-sulfonic acid, 2-amino naphthalene-4,7- or -4,8-disulfonic acid, which, for example, may be diazotized and coupled in conventional manner with any desired coupling component, or the halopyridazonealkylamides of nitrobenzoic acid and nitronaphthoic acids, such as 2-, 3- and 4-nitrobenzoic acid or 5-nitronaphthoic acid. Examples of halopyridazone derivatives capable of coupling are 1-aminonaphthalene-5-, -6-, or -7-sulfonic acid halopyridazonealkylamides, 2-amino-8-hydroxynaphthalene-6-sulfonic acid halopyridazonealkylamides, 2-hydroxynaphthalene-3-carboxylic acid halopyridazonealkylamides, 3-(acetoacetylaminophenyl)-sulfonic acid halopyridazonealkylamides and 1-phenyl-3-methylpyrazolone-5,3′-sulfonic acid halopyridazonealkylamides, and they may be coupled with any diazo components. Halopyridazone dye precursors containing amino groups may however also be reacted with dye sulfonic acid halides.

Of the dyes according to the present invention, azo dyes, anthraquinone dyes and phthalocyanine dyes are preferred, particularly those which are water-soluble.

The azo dyes, for example, may be represented by the general formula:

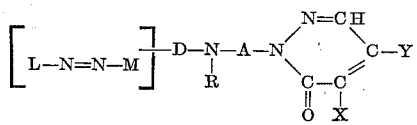

in which L denotes the radical of a diazo component of the benzene or naphthalene series, M denotes the radical of a coupling component of the benzene series, the naphthalene series or the pyrazolene series, D denotes a —SO₂— or —CO— group, R denotes a hydrogen atom, a low molecular alkyl radical, a cycloalkyl radical, an aralkyl radical or an aryl radical, A denotes a low molecular weight alkylene radical having two to six carbon atoms in the chain, X denotes a chlorine or bromine atom and Y denotes a chlorine or bromine atom, and the term azo dyes is intended to include disazo dyes and also copper, 1:2-chromium and 1:2-cobalt complexes of o,o′-dihydroxyazo dyes.

The anthraquinone dyes of this invention may be represented for example by the following general formulae:

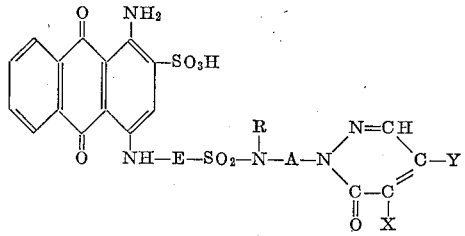

and

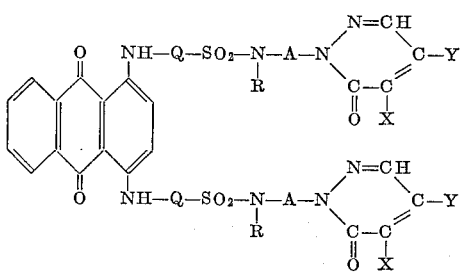

in which E denotes a phenylene, toluylene or diphenylene radical, Q denotes a sulfodiphenylene or a sulfonaphthylene radical and R, A, X and Y have the meanings given above.

Of the phthalocyanine dyes according to this invention, those are preferred which correspond to the general formula:

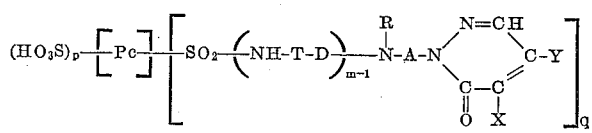

in which Pc denotes the radical of copper phthalocyanine, a chloro-copper phthalocyanine with 1 to 4 chlorine atoms, a phenylcopper phthalocyanine with 1 to 4 phenyl radicals or nickel phthalocyanine, T denotes a phenylene radical which may be substituted, D denotes a —SO₂— or —CO— group, R denotes a hydrogen atom, a low molecular weight alkyl radical, a cycloalkyl radical, an aralkyl radical or an aryl radical, A denotes a low molecular weight alkylene radical with two to six carbon atoms in the chain, X denotes a chlorine or bromine atom, Y denotes a chlorine or bromine atom, m denotes one of the numbers 1 and 2, p a whole or fractional number from 1 to 4, q a whole or fractional number from 1 to 3, the sum of p and q being one of the numbers from 3 to 6, and R, A, X and Y having the meanings given above. When the dyes do not contain any water-solubilizing groups, they have poor solubility or are insoluble in water. It is preferable however to choose the reaction components so that the final dye has at least one water-solubilizing group, preferably a sulfonic acid group. The term sulfonic acid group or —SO₃H in connection with the said dyes is intended to include the salts of, for example, alkali metal salts. When starting from dyes or dye precursors which contain in the molecule more than one sulfonic acid halide group, for example from tetrazaporphin polysulfonic acid halides, all the sulfonic acid halide groups may be reacted according to this invention or only some of them may be so reacted and the unreacted sulfonic acid halide groups converted into free sulfonic acid radicals by saponification. Water-soluble dyes are thus obtained.

The new dyes are suitable for dyeing and printing materials such as fibers, filaments, threads, flock, woven fabrics, knitted fabrics, felts and the like of wool, silk, linear sythetic polyamides and leather, and also materials of the said types of native and/or regenerated cellulose, such as cotton, linen, viscose, hemp or jute, and it is advantageous to work in the presence of acid-binding agents. The dyes which are insoluble or sparingly soluble in water may be used in dispersed form if desired.

The procedure for dyeing with the new dyes may be, for example, that the textile material, for example, of cellulose, is padded with a solution of the dye according to this invention, if necessary with the addition of electrolytes, and then passed after drying through a bath which contains an alkaline reagent, such as sodium hydroxide, sodium carbonate, sodium bicarbonate, potassium hydroxide or potassium carbonate and advantageously electrolytes, the dye being fixed on the fiber by steaming for a short time. Treatment with hot air at 50° to 200° C., preferably at 140° to 160° C., may be used instead of steaming. The alkaline reagent may however also be added to the padding bath. Furthermore it is possible to dye with the dyes with the addition of alkaline reagents and if desired of electrolytes at low temperature and to fix the dye by gradually increasing the temperature of the bath. Textile material of cellulose may also be pretreated with a solution of alkaline reagents, dried and then dyed with a dye of the said type which is then fixed.

When printing cellulosic materials, the dyes are advantageously applied to the fiber together with a thickening agent, such as sodium alginate or tragacanth, advantageously with one of the conventional printing auxiliaries and an alkaline reagent, dried at temperatures preferably between 50° and 150° C. and steamed for a short time. The dye may also be printed onto the fabric together with a thickening agent and one of the conventional printing auxiliaries, the fabric dried, passed through a bath charged with alkaline reagents and then dried at a temperature between 50° and 200° C. or steamed at 100° to 105° C. A fabric which has been treated with alkaline reagents may also be printed with the dye together with thickening agents and printing auxiliaries, and then dried or steamed.

The invention is illustrated by, but not limited to, the following examples. The parts and percentages specified in the examples are, unless otherwise stated, parts and percentages by weight. Parts by volume bear the same relation to parts by weight as the liter under standard conditions to the kilogram.

*Example 1*

A solution of 50 parts of copper phthalocyanine in 400 parts of chlorosulfonic acid is heated for four hours at 130° to 135° C., cooled and the mixture poured onto 3500 parts of crushed ice. The reaction product is filtered off and washed with ice-water. The moist filter residue is made into a paste with 300 parts of ice and 300 parts of an aqueous solution containing 32 parts of 1-(2′aminoethyl)-4,5-dichloropyridazone-(6) hydrochloride and, while stirring, 80 parts of a 50% aqueous sodium acetate solution is allowed to flow in. The pH value is adjusted to 6 by adding 10% aqueous sodium carbonate solution. The mixture is stirred for 15 to 20 hours at room temperature, the pH value not being allowed to change. The solution is then adjusted to pH value 3 with dilute aqueous hydrochloric acid, the precipitate filtered off and the product dried under reduced pressure at about 50° C. 100 parts of a blue dye is obtained having the formula:

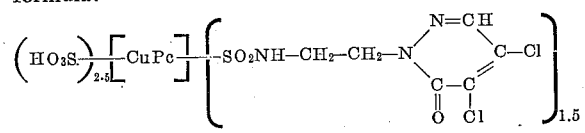

By using 43 parts or 64 parts of 1-(2′aminoethyl)-4,5-dichloropyridazone-(6)-hydrochloride instead of 32 parts thereof, similar blue dyes are obtained.

A cotton fabric is padded with a liquor containing per liter 20 g. of the dye obtained according to the first paragraph of this example, 250 g. of urea and 20 g. of sodium carbonate, squeezed out, dried and treated for five minutes with hot air at 140° to 150° C. The fabric is rinsed and soaped at the boil. A turquoise blue dyeing fast to wet treatment and to light is obtained.

By coemploying conventional printing auxiliaries a printing paste may be prepared. When cotton cambric is printed therewith and the material treated in the above-mentioned way, turquoise blue prints fast to washing and to soda boiling are obtained.

*Example 2*

100 parts of copper phthalocyanine tetrasulfonic acid di-β-chloroethylamide is dissolved in 600 parts of water with an addition of 40 parts of hydrazine hydrate and 30 parts of 50% caustic soda solution while stirring at 5° to 10° C. The mixture is allowed to stand at room temperature for twenty hours, the reaction product is precipitated by acidifying the solution to pH 2 with dilute hydrochloric acid and the precipitate filtered off. The filter residue is dissolved in 800 parts of water, the solution adjusted to pH 7 and a warm solution of 40 parts of mucochloric acid in 200 parts of water added. The whole is stirred for an hour at room temperature, gradually heated to 80° to 90° C. and kept at this temperature for about three hours with gradual addition of 250 parts of 32% hydrochloric acid. After the dye has been filtered off and dried under reduced pressure at moderate temperatures, the yield is 110 parts. The dye has the formula:

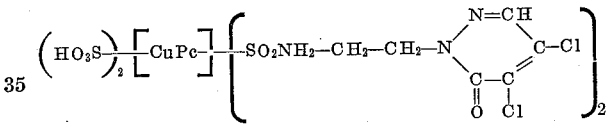

Cotton textile material is padded with a liquor containing per liter 30 g. of the said dye and 10 g. of sodium hydroxide solution (40° Bé.), squeezed out, dried and steamed for eight minutes at 100° C. The dyed material is rinsed and soaped at the boil. Turquoise blue dyeings very fast to washing are obtained. By using the equivalent amount of mucobromic acid instead of mucochloric acid, a turquoise blue dye is obtained having similar properties and the formula:

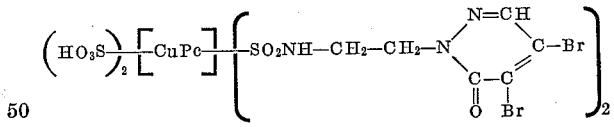

*Example 3*

A solution of 58 parts of copper phthalocyanine in 500 parts of chlorosulfonic acid which has been heated for four hours at 135° to 140° C. is cooled and poured onto 4000 parts of ice. The precipitate is filtered off. The moist filter residue is mixed with 300 parts of ice, the mixture neutralized with 10% sodium hydroxide solution and a solution of 16 parts of sodium carbonate and 9 parts of ethylenimine in 200 parts of water is added. The reaction of the mixture is maintained at a pH above 8 by addition of 10% sodium carbonate solution. As soon as the alkaline reaction persists, 30 parts of a 50% sodium hydroxide solution is dripped in and 30 parts of hydrazine hydrate is added to the clear solution. The solution is allowed to stand at room temperature for twenty hours and is then acidified with dilute hydrochloric acid; the precipitate formed is filtered off. The filter residue, while still moist, is stirred into 400 parts of water and a solution of 40 parts of mucochloric acid in 200 parts of water is allowed to flow in. The whole is stirred for three hours at room temperature and then heated at 70° to 80° C. for an hour, 100 parts of concentrated hydrochloric acid is added and the whole heated for another two hours at 80° to 90° C. The product is filtered and dried under reduced pressure at 50° to 60° C. 110 parts of a blue dye is obtained which is identical with that obtained according to Example 2.

Cotton cambric is padded with a 3% solution of the dye, then padded with a liquir containing per liter 20 g. of sodium bicarbonate and 300 g. of Glauber's salt, and the fabric is dried and steamed for eight minutes at 100° C. The cambric is rinsed and soaped and turquoise blue dyeings having good fastness to light and wet treatment are obtained.

Example 4

50 parts of tetraphenylcopper phthalocyanine is introduced into 400 parts of chlorosulfonic acid while stirring and the whole heated for an hour at 120° C. and for four hours at 130° to 135° C. The reaction product is isolated in the conventional way, made into a paste, while still moist, with 300 parts of ice and neutralized with 10% aqueous caustic soda solution while stirring at 0° to 5° C. A solution of 29 parts of 1-(2'-aminoethyl)-4,5-dichloropyridazone-(6) hydrochloride in 250 parts of water is added, then 70 parts of crystallized sodium acetate and a pH value of 6 to 6.5 is set up by adding 10% aqueous sodium carbonate solution. The said pH value is maintained for about twenty hours at room temperature and then the dye is precipitated by acidification. The dye is filtered off and dried under reduced pressure at about 60° C. A dye having the formula:

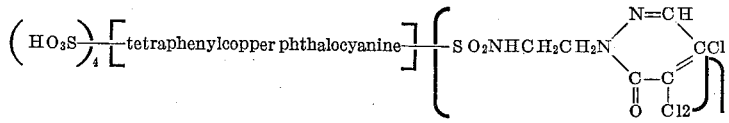

is obtained. It can be fixed on cotton with a green color under alkaline conditions.

Similar products are obtained by using 43 or 58 parts of 1 - (2' - aminoethyl) - 4,5 - dichloropyridazone - (6) hydrochloride instead of 29 parts or by using 31 parts of 1 - (2' - N - methylaminoethyl) - 4,5 - dichloropyridazone-(6) hydrochloride or 35 parts of 1-(6'-aminohexyl)-4,5-dichloropyridazone-(6) hydrochloride.

Example 5

74 parts of tetraphenylcopper phthalocyanine hexasulfonic acid-tri-β-chloroethylamide, 40 parts of hydrazine hydrate and 17 parts of caustic potash are dissolved at about 5° C. in 600 parts of water and the solution is stirred for about twenty hours at room temperature. The reaction product is then precipitated by acidification in the usual way and filtered off. The filtered material is dissolved in water, adjusted to pH 7 and a solution of 40 parts of mucochloric acid in 200 parts of water added to the mixture. The whole is stirred for some time at room temperature, then heated for an hour at 75° C., for two hours at 80° C. with an addition of 100 parts of concentrated hydrochloric acid, and the reaction product filtered off and dried. 87 parts of a green dye is obtained.

The corresponding β-bromoethyl compound may be used for the reaction instead of the β-chloroethylamide derivative with an analogous result.

Example 6

58 parts of copper phthalocyanine is converted in conventional fashion into the copper phthalocyanine tetrasulfonic acid chloride and the moist dye mixed with 200 parts of ice and 100 parts of crystallized sodium acetate. A solution of 52 parts of 1-(aminopropyl)-4,5-dichloropyridazone-(6) hydrochloride in 250 parts of water is then allowed to flow in. The pyridazone is prepared by condensation of aminopropylhydrazine (obtained by reaction of hydrazine hydrate with 2-methylethylenimine) with mucochloric acid in hydrochloric acid solution and probably has the following constitution:

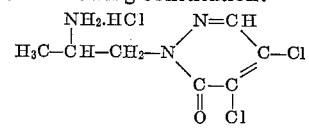

The pH value of the mixture is adjusted to about 6 by adding dilute aqueous sodium carbonate solution and maintained for about twenty hours. The mixture is then acidified with dilute hydrochloric acid to pH 2 and the dye filtered off. It has the formula:

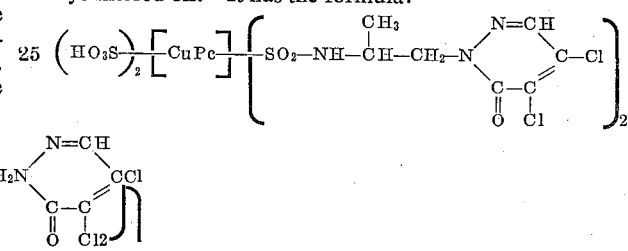

It can be fixed on cotton with a wet fast turquoise blue color by means of alkaline reacting agents.

A sulfonic acid chloride obtained in a conventional way from copper phthalocyanine-4,4',4'',4'''-tetrasulfonic acid or a nickel phthalocyanine containing a sulfochloride group may be used with similar results instead of the above mentioned copper phthalocyanine tetrasulfonic acid chloride.

Example 7

30 parts of monochlorocopper phthalocyanine is heated in 250 parts of chlorosulfonic acid for three hours at 125° to 130° C. The solution is cooled and added to 2000 parts of ice and 1000 parts of water and the precipitate filtered off. The filter residue is washed with 1000 parts of ice cold water and then mixed with 150 parts of ice and a solution of 19 parts of 1-(3'-aminopropyl)-4,5-dichloropyridazone-(6) hydrochloride (which can be prepared by reaction of molar amounts of 3-aminopropyl-1-hydrazine and mucochloric acid in aqueous hydrochloric acid solution) in 150 parts of water. Then 10% aqueous sodium hydroxide solution is dripped in at 0° to +5° C. while stiring vigorously ustil the pH value of the mixture is 6.0 to 6.5 and this pH value is maintained for fifteen hours at room temperature. 100 parts of 10% aqueous hydrochloric acid is added and the precipitate is filtered off. It consists of a mixture of dyes of the following constitutions:

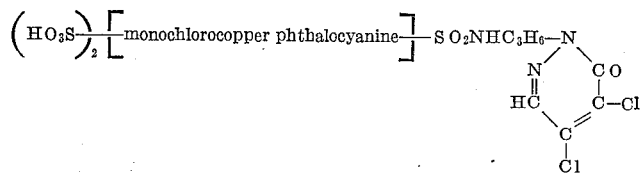

and

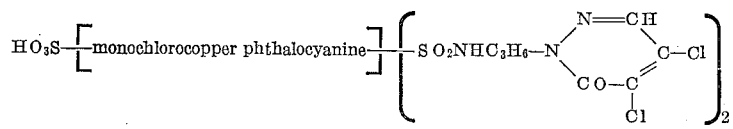

Wet fast dyeings in turquoise blue shades are obtained on cellulosic textile material with the said mixture of dyes.

Similar dyes are obtained by using dichlorocopper, trichlorocopper or tetrachlorocopper phthalocyanine.

Example 8

20 parts of monochlorocopper phthalocyanine disulfonic acid β-chloropropylamide disulfonic acid and 80 parts of 24% hydrazine hydrate solution are stirred in 100 parts of water and the pH value of the solution is adjusted to about 12.0 to 12.5 by adding 50% caustic soda solution. After about twenty hours, the reaction product is precipitated from the solution by adding dilute hydrochloric acid and filtered off. The filter residue is then stirred into 150 parts of water, the mixture reacting neutral, and a solution of 10 parts of mucochloric acid in 50 parts of water is allowed to flow in. The mixture is stirred for several hours at room temperature, heated to about 80° C., 200 parts of concentrated hydrochloric acid added after about an hour and the reaction product filtered off by suction after heating for another two hours. A dye is obtained which can be fixed wash fast on cotton in turquoise blue shades in the presence of alkaline reacting agents.

Example 9

20 parts of p-aminobenzenesulfonic acid ethylenimide is stirred in 135 parts of an about 20% aqueous hydrazine solution at room temperature for two to three hours. After an almost clear solution has been formed, it is heated for an hour on a boiling waterbath and traces of undissolved constituents are filtered off. The solution is then evaporated to dryness under reduced pressure, the residue taken up in 100 parts of about 18% hydrochloric acid, a solution of 17 parts of mucochloric acid in 50 parts of water added and the whole heated for three hours at 90° to 95° C. The filtered solution is concentrated to half its volume, about 20 parts of [4,5-dichloropyridaz-6-one-1-ethyl - (p - aminobenzenesulfonic acid)-amide]-hydrochloride having the melting point 179° to 182° C. (with decomposition) crystallizing out.

$C_{12}H_{13}Cl_3N_4O_3S + H_2O$ (molecular weight: 416.5).—Calculated: C 34.6, H 3.6, N 13.5, Cl 25.6, S 7.7. Found: C 34.9, H 3.4, N 13.8, Cl 25.7, S 7.7.

The compound thus obtained is diazotized and coupled in conventional manner with 1-(2'-chlorophenyl-5'-sulfonic acid)-2-methylpyrazolone-(5). A yellow dye of the formula:

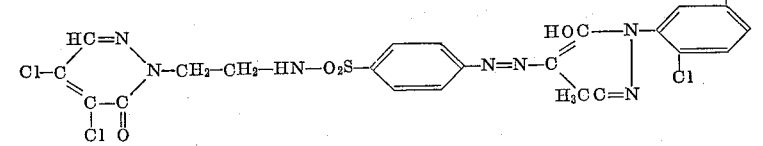

is obtained. It can be fixed in fast yellow shades on cotton.

Example 10

70 parts of acetylsulfanilic acid chloride is stirred at 0° to 5° C. into a solution of 75 parts of the hydrochloride of 1-(2'-aminoethyl)-4,5-dichloropyridadone-(6) in 750 parts of water and 120 parts of 10% aqueous sodium carbonate solution gradually added in the cold. 160 parts of 10% sodium carbonate solution is then dripped in at such a rate that the pH value of the mixture always remains at about 6.5 to 7.0. The mixture is allowed to stand for about ten hours at room temperature and the reaction product is then filtered off, washed with cold water and dried under reduced pressure at 50° to 60° C. 4,5-dichloropyridaz-6-one-1-ethyl-(acetyl - sulfanilic acid) amide is obtained as a colorless crystalline product having the melting point 138° to 141° C.

Analysis.—$C_{14}H_{14}Cl_2N_4O_4S + H_2O$ calculated: C 39.8, H 3.8, N 13.2, S 7.6, Cl 16.8. Found: C 39.8, H 3.7, N 12.9, S 7.8, Cl 16.9.

40 parts of this compound is heated for thirty minutes in 100 parts of 32% hydrochloric acid at about 95° C. The acetyl group is thereby split off and the hydrochloride of 4,5 - dichloropyridazone-(6)-1-ethyl-(sulfanilic acid) amide crystallizes out. It is taken up while hot in a mixture of 200 parts of water and 100 parts of propyl alcohol, the solution cooled to +5° C., 30 parts by volume of a 23% aqueous sodium nitrite solution added and the mixture stirred until a clear solution has formed. After stirring for another two hours at 5° to 10° C., the diazo solution is allowed to flow at 5° C. into a solution of 22 parts of 1-hydroxynaphthalene-4-sulfonic acid, 4 parts of caustic soda and 70 parts of crystallized sodium acetate in 600 parts of water, and a pH value of about 6 is set up by adding 10% sodium carbonate solution. When coupling has ended, the reaction product is filtered off and dried at a slightly elevated temperature under reduced pressure. About 65 parts of a red dye of the formula:

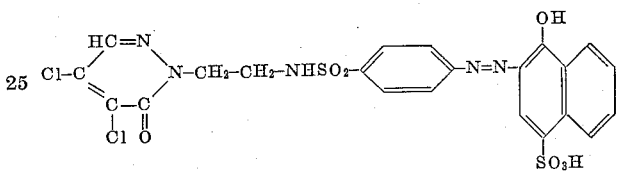

is obtained. It can be fixed in wet fast fashion on cotton with the aid of alkaline reacting agents.

Other dyes are obtained in a similar way when the following coupling components are used insead of 1-hydroxynaphthalene-4-sulfonic acid:

| Coupling component | Shade of the dyeing on cotton |
| --- | --- |
| 1-hydroxynaphthalene-5-sulfonic acid | Red. |
| 1-hydroxynaphthalene-3,8-disulfonic acid | Red. |
| 1-benzoylamino-8-hydroxynaphthalene-4,6-disulfonic acid | Red. |
| 1-acetylamino-8-hydroxynaphthalene-3,6-disulfonic acid | Red. |
| 1-(phenyl-4'-sulfonic acid)-3-methylpyrazolone-(5) | Yellow. |
| 1-(2'-chlorophenyl-5'-sulfonic acid)-methylpyrazolone-(5) | Do. |

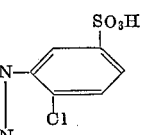

Example 11

A solution of 25 parts of copper phthalocyanine in 200 parts of chlorosulfonic acid is heated for four hours at 130° to 135° C., cooled and poured onto 1500 parts of ice and 500 parts of water, the precipitate filtered off and the filter residue washed with cold water. The filtered material is then mixed with 200 parts of ice and a solution which has been prepared by heating for twenty minutes 27 parts of the 4,5-dichloropyridazone-(6)-1-ethyl-(acetylsulfanilic acid) amide obtained according to Example 10, paragraph 1, in 50 parts of concentrated hydrochloric acid, dilution with 250 parts of water and cooling. Then 170 parts by volume of 10% sodium hydroxide solution is dripped in and the pH value kept at 6.0 to 6.8 for twenty hours by gradual addition of 65 parts by volume of 10% sodium carbonate solution. The dye is precipitated by acidification with dilute hydrochloric acid to pH 2, the product filtered off, washed with alcohol and dried in the air.

About 60 parts of a turquoise blue dye of the formula:

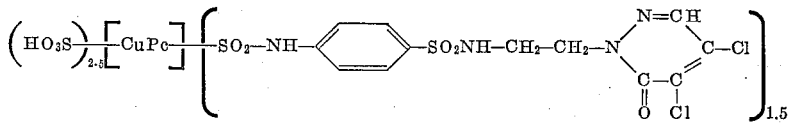 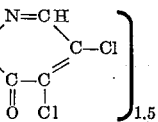

is obtained. It can be fixed wet fast on cotton by means of alkaline reacting agents.

By using 4,5-dichloropyridazone-(6)-1-ethyl-(m-aminobenzoic acid) amide (prepared by reduction of the nitro compound) instead of 4,5 - dichloropyridazone - (6) - 1-ethyl-(sulfanilic acid) amide, a similar turquoise blue dye is obtained.

*Example 12*

55 parts of the dye of the formula:

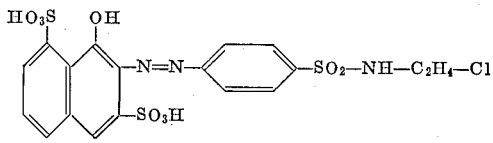

(obtained by diazotization of sulfanilic acid β-chloroethylamide and coupling with 1-naphthol-3,8-disulfonic acid) is dissolved in 400 parts of water, neutralized, 25 parts of hydrazine hydrate and 80 parts of about 10% aqueous caustic soda solution are added and the mixture is stirred for twenty hours at room temperature. The reaction product is then precipitated by acidification with dilute hydrochloric acid to a pH of about 3, filtered off, dissolved in 400 parts of water and neutralized. A solution of 20 parts of mucochloric acid in 70 parts of water is added, the whole stirred for some hours at room temperature, gradually heated to about 90° C. and 100 parts of concentrated hydrochloric acid allowed to flow in at this temperature within two hours. The dye is isolated by filtering the cooled solution and dried. About 68 parts of an orange red dye having the formula:

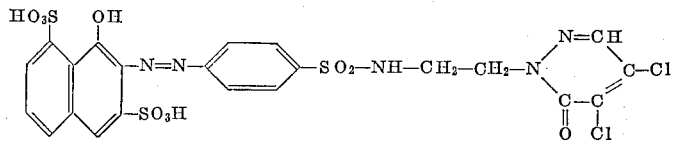

is obtained. It can be fixed wet fast on cotton by means of alkaline reacting agents.

*Example 13*

60 parts of the sulfuric acid ester of 1-aminobenzene-4-sulfonic acid β-hydroxyethylamide and 75 parts of hydrazine are stirred into 165 parts of water, 84 parts of 40% potassium hydroxide solution is added and the mixture heated for about 10 hours at 100° C. while stirring. The deposited salt is filtered off in the cold and the filtrate evaporated to dryness under reduced pressure. The residue is taken up in 150 parts of about 22% hydrochloric acid, a hot solution of 34 parts of mucochloric acid in 100 parts of water added and the whole heated for four hours at 90° to 95° C. The [4,5-dichloropyridaz-6-one-1-ethyl-(4'-aminobenzenesulfonic acid)] amide hydrochloride having the melting point 179° to 182° C. (with decomposition) which crystallizes out is filtered off while cold, the filtrate concentrated to about one third of its volume and about the same volume of alcohol added. The crystallizate is filtered off, washed with a little alcohol and dried in the air. The total yield of reaction product is 62 parts.

40 parts of this compound is diazotized in hydrochloric acid solution with 30 parts by volume of 23% sodium nitrite solution and coupled with a solution of 22 parts of 1-hydroxy-naphthalene-4-sulfonic acid in 200 parts of water in the presence of sodium acetate in conventional manner. A red dye capable of being fixed on cotton under alkaline conditions is obtained which is identical with the dye of Example 10.

*Example 14*

136 parts of sulfanilic acid chloroethylamide hydrochloride in 100 parts of water is stirred at 0° to +5° C. with 200 parts of about 50% aqueous hydrazine hydrate and while cold 240 parts of 25% aqueous sodium hydroxide solution is gradually added. The whole is stirred for twenty hours at room temperature, heated for two hours at 90° to 95° C. and any small amount of undissolved substance is filtered off. 50 parts of concentrated hydrochloric acid is added to the filtrate and the whole evaporated to dryness under reduced pressure. The residue is taken up in 100 parts of water and 750 parts of 32% hydrochloric acid and at about 70° C. a hot solution of 85 parts of mucochloric acid in 350 parts of water is added and the whole heated for 2.5 hours at 80° to 85° C. Part of the reaction product crystallizes out. The liquid is concentrated to about one third of its volume under reduced pressure and the product filtered off while cold. After drying the product, about 240 parts of [4,5-dichloropyridaz - 6 - one - one - 1 - ethyl - (p-aminobenzenesulfonic acid)-amide] hydrochloride is obtained which still contains 37% of sodium chloride. A further amount of the pyridazone derivative is obtained by diluting the mother liquor with water and neutralizing the strongly acid solution with dilute sodium hydroxide or sodium carbonate solution.

Sulfanilic acid-β-bromoethylamine hydrobromide or the hydrochlorides of sulfonilic acid-β-chloropropylamide, m-aminobenzenesulfonic acid - β - chloroethylamide, o-aminobenzenesulfonic acid-β-chloroethylamide, 1-amino-2,5-dichlorobenzene-4-sulfonic acid β - chloroethyl - sulfamide or 1-amino-3-chloro-4-methylbenzene-6-sulfonic acid β-chloroethylamide may be reacted instead of sulfanilic acid chloroethylamide hydrochloride.

64 parts of the product obtained in paragraph 1 of this example is dissolved in 100 parts of concentrated hydrochloric acid and 200 parts of water while heating and the mixture coled and diazotized with 30 parts by volume of a 23% sodium nitrite soltuion. The diazo solution is coupled with 300 parts of a solution which contains 29 parts of 1-(2'-chlorophenyl-5'-sulfonic acid)-3-methyl-pyrazolone-(5), 4 parts of caustic soda and 40 parts of crystallized sodium acetate, the pH value being adjusted to 5 by the gradual addition of 10% sodium carbonate solution. After coupling has ended, the yellow dye is filtered off and dried. It is identical with the dye of Example 9.

Cotton fabric is padded with a liquor which contains per liter 20 g. of the said dye, 250 g. of urea and 20 g. of sodium carbonate, squeezed out and the fabric then treated for five minutes with hot air at 145° C. The dyed fabric is then rinsed and soaped at the boil. A wet fast and light fast dyeing is obtained in strong yellow shades.

*Example 15*

25 parts of 1-(2'-aminoethyl)-4,5-dichloropyridazone-(6) hydrochloride and a paste of 27 parts of 1-acetylaminonaphthalene-5-sulfonic acid chloride in 100 parts of water are stirred at +5° to 10° C. into 200 parts of N-methylpyrrolidone. A solution of 50 parts of crystallized sodium acetate in 50 parts of water is added. The whole is stirred for several hours at room temperature. 1000 parts of saturated sodium chloride solution is added to the amost clear solution, and the reaction product which gradually solidifies is filtered off. The product is washed free from salt with water and dried.

25 parts of the product thus obtained is heated for fifteen minutes in 100 parts of 30% hydrochloric acid, then 75 parts of glacial acetic acid is added and coupling effected in the cold in the presence of sodium acetate with a diazo suspension of 9 parts of sulfanilic acid prepared in the conventional way. An orange red dye of the formula:

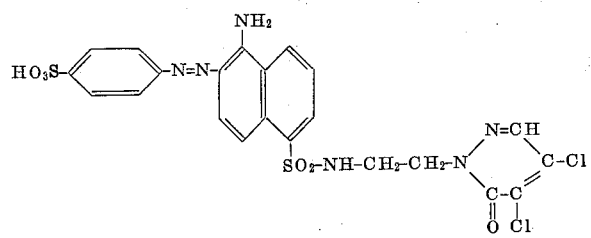

is obtained by salting out.

The following dyes and their metal complexes are obtained in an analogous way: in the formulae; R represents the grouping:

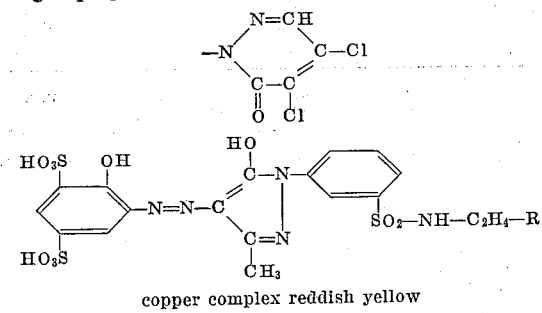

copper complex reddish yellow

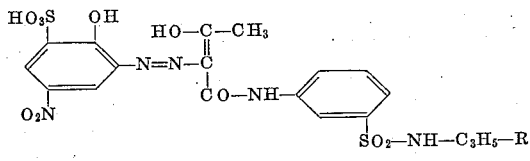

1 : 2-cobalt complex yellow

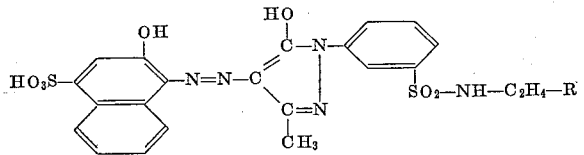

1 : 2-chromium complex bluish red

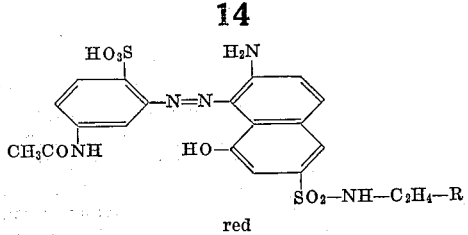

red

Example 16

28 parts of acetylsulfanilic acid-β-chloroethylamide is heated in 50 parts of concentrated hydrochloric acid for fifteen minutes on a boiling waterbath, 100 parts of water is added thereto and diazotization effected in the cold with 30 parts by volume of 23% sodium nitrite solution. A solution of 29 parts of 1-(2'-chlorophenyl-5-sulfonic acid)-3-methylpyrazolone-(5), 4 parts of sodium hydroxide and 40 parts of crystallized sodium acetate in 200 parts of water is coupled with the diazo solution at 5° C. and 150 parts of 10% sodium carbonate solution is added. When coupling has ended, the dye is filtered off, the moist product stirred into 200 parts of water, then 100 parts of 10% hydrazine soltuion and 16 parts of 50% sodium hydroxide solution are added and the whole is stirred at room temperature for twenty hours. The mixture is acidified to pH 1 by adding dilute hydrochloric acid and the reaction product is filtered off. The filter residue is stirred into 500 parts of water, neutralized with dilute caustic soda solution, a solution of 25 parts of mucochloric acid in 120 parts of water added, the mixture stirred for some time at room temperature, then heated to 85° to 90° C. and after two hours 100 parts of hydrochloric acid is added. The whole is stirred for another one to two hours while hot and after the mixture has been cooled the dye is filtered off. After drying, about 60 parts of a dye is obtained which is identical with the dye of Example 9.

Example 17

106 parts of 10% aqueous sodium carbonate solution is gradually added while stirring to a mixture of 23 parts of acetylsulfanilic acid chloride and 26 parts of 1-(2'- or 3'-aminopropyl)-4,5-dichloropyridazone-(6) hydrochloride in 200 parts of water at 0° to 5° C., care being taken that the mixture does not become alkaline. After the mixture has stood for ten hours at room temperature, the colorless and crystalline reaction product is filtered off and dried. It is 4,5-dichloropyridaz-6-one-1-propyl-(acetylsulfanilic acid)-2'- or -3'-amide.

21 parts of the compound thus obtained is heated in 50 parts of concentrated hydrochloric acid for twenty minutes on a boiling waterbath and diazotized in the cold with 15 parts of 23% aqueous sodium nitrite solution after the addition of 150 parts of water. The diazo solution is coupled in the conventional way with 13 parts of 1-(phenyl-4'-sulfonic acid)-3-methylpyrazolone-(5) and the dye filtered off and dried under reduced pressure at 40° to 45° C. A yellow dye is obtained having the formula:

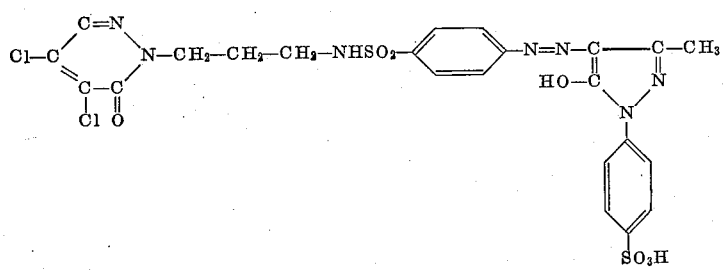

Example 18

58 parts of copper phthalocyanine is heated in 500 parts of chlorosulfonic acid for four to five hours at 135° C., the reaction mixture then being cooled and poured into ice-water. The reaction product is filtered off and the filtered product washed with cold water, mixed with 300 parts of ice and neutralized with 60 parts of about 10% sodium hydroxide solution. A solution of 40 parts of a product (obtained from molar amounts of β-aminoethylhydrazine and acetone at room temperature) in 200 parts of water is added while stirring and 200 parts of 10% sodium carbonate solution is added gradually. The mixture is stirred for ten hours at room temperature and the reaction product is precipitated by acidification with dilute hydrochloric acid to pH 2 and filtered off.

This product is dissolved in 1500 parts of water, neutralized, a hot solution of 50 parts of mucochloric acid in 250 parts of water added, the whole stirred for two hours at room temperature, two hours at 80° to 90° C. and, after the addition of 200 parts of concentrated hydrochloric acid, for two hours at 90° to 95° C. The product is then filtered off hot, washed with a little water and dried under reduced pressure at 50° C. The dye is ground with 5% of sodium phosphate. The dye has the formula:

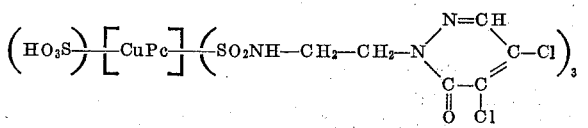

It can be fixed on cotton in wet fast turquoise blue shades by means of alkaline reacting agents.

Example 19

A solution of 221 parts of m-nitrobenzenesulfonic acid chloride in 500 parts by volume of chloroform is allowed to flow at about 10° C. while stirring within about two hours into a solution of 269 parts of 1-(2'-aminoethyl)-4,5-dichloropyridazone-(6) hydrochloride in 2000 parts of water. The pH value of the mixture is kept at about 7.5 by adding 10% sodium carbonate solution. The whole is stirred for another fifteen hours and the reaction product then filtered off by suction, washed and dried. 250 parts of the compound having the formula:

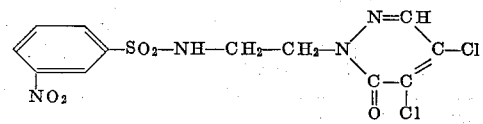

is obtained. This compound is stirred with 1000 parts by volume of n-propyl alcohol and allowed to flow gradually into a boiling mixture of 120 parts of iron powder, 15 parts of glacial acetic acid and 600 parts of water which has been preheated at 100° C. for fifteen minutes. After boiling for another hour, the whole is filtered hot. Upon cooling, 4,5-dichloropyridazone-1-ethyl-(3-aminobenzene-1-sulfonic acid)-amide crystallizes from the filtrate. It has a melting point of 178° to 179° C. The yield is 143 parts.

A solution of 18 parts of the amine thus obtained in 60 parts by volume of dimethylformamide is poured into a mixture of 200 parts of ice-water and 20 parts of concentrated hydrochloric acid. The yield is 143 parts.

A solution of 18 parts of the amine thus obtained in 60 parts by volume of dimethylformamide is poured into a mixture of 200 parts of ice-water and 20 parts of concentrated hydrochloric acid. Then 16 parts of a 23% aqueous sodium nitrite solution is dripped in and the whole stirred for another four hours. The excess of nitrite is destroyed, the diazo suspension adjusted to pH 6 and coupled with a solution of 16 parts of 1-(2-chlorophenyl-5-sulfonic acid)-3-methylpyrazolone-(5), 2 parts of sodium hydroxide and 22 parts of crystallized sodium acetate in 300 parts of ice-water. The whole is stirred for about fifteen hours at room temperature and the dye then salted out, filtered off by suction and dried. 32 parts of a yellow dye having the formula:

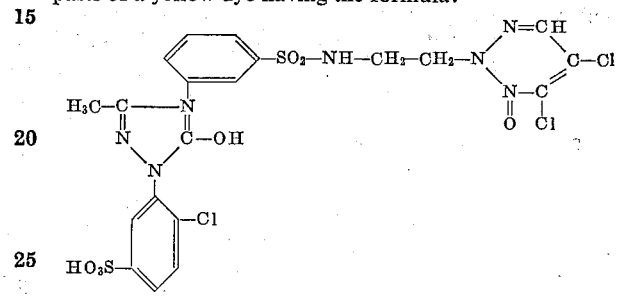

is obtained; it can be fixed wet fast on cotton.

Further dyes are obtained in a similar way by using the following coupling components instead of 1-(2-chlorophenyl-5-sulfonic acid)-3-methylpyrazolone-(5).

| Coupling component | Shade of dyeing on cotton |
|---|---|
| 2-aminonaphthalene-5-sulfonic acid | Orange. |
| 2-acetamino-5-hydroxynaphthalene-7-sulfonic acid | Do. |
| 1-hydroxynaphthalene-4-sulfonic acid | Yellowish red. |
| 1-acetamino-8-hydroxynaphthalene-4,6-disulfonic acid | Bluish red. |
| ![structure] | |
| 1=2-cobalt complex | Brown. |
| 1=2-chromium complex | Reddish brown. |

According to the measures described in the first and second paragraphs of this example, and subsequent diazotization and coupling, it is also possible to prepare the dye of the following formula:

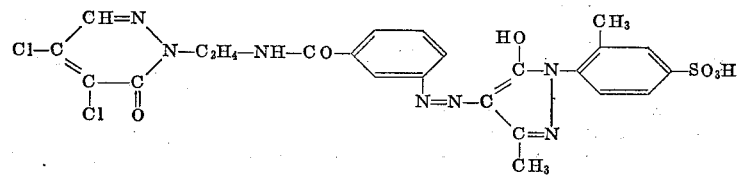

which gives greenish yellow dyeings on cotton.

Example 20

20 parts of 1-amino-4-p-toluidinoanthraquinone-2-sulfonic acid is introduced at 20° to 25° C. into 200 parts of chlorosulfonic acid, stirred for two hours at this temperature, heated to 45° C. and kept for another two hours at this temperature. The mixture is then poured into 200 parts of saturated aqueous sodium chloride solution and about 1000 parts of ice. The precipitate is filtered off by suction and washed with 20% aqueous sodium chloride solution until the wash water no longer blues Congo paper. The filter residue is placed in a stirring flask which is filled up with ice-water to 250 parts and the contents are vigorously stirred and the mixture adjusted to pH 6.5 to 7 by adding about 25 parts of 10% aqueous sodium carbonate solution. Then a solution of 25 parts of 1-(2'-aminoethyl)-4,5-dichloropyridazone-6 hydrochloride in 150 parts of water is added and the pH kept at 6.5 to 7.5 by adding 10% aqueous sodium carbonate solution. The mixture is stirred for fifteen to twenty hours at room temperature and the product is then filtered off by suction, washed with about 1000 parts of 10% aqueous sodium chloride solution and dried in a stream of air at about 30° to 40° C. A blue dye of the formula:

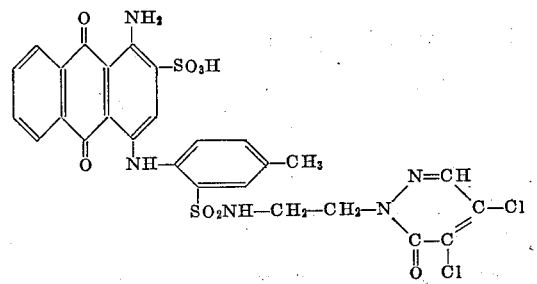

is obtained in a good yield. It may be fixed wet fast on cotton by the method described in Example 1.

Dyes of the following formulae are obtained in the same way:

(21)
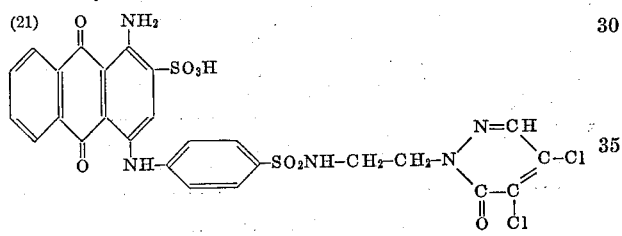

(22)
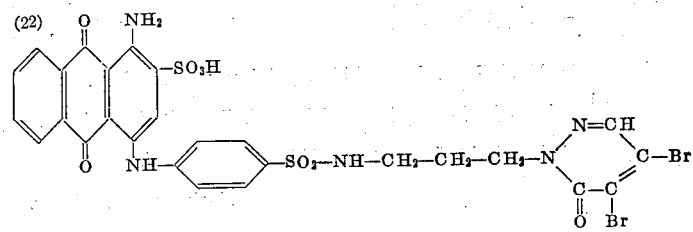

(23)
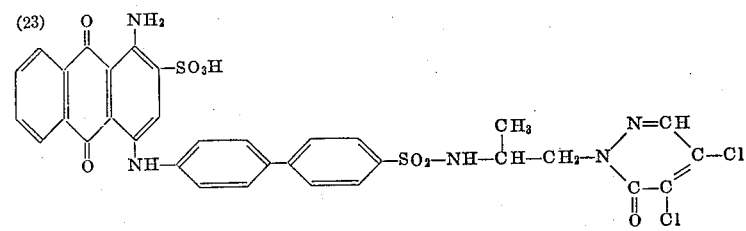

Example 24

30 parts of 1,4-di-(p-phenylanilino)-anthraquinone is introduced at 5° to 10° C. into 300 parts of chlorosulfonic acid, the temperature is allowed to rise to 20° to 25° C., the whole is stirred for three hours at this temperature, then heated to 100° C. within an hour and stirred for three hours at this temperature. The mixture is cooled slowly and the reaction product poured into a mixture of ice and water, filtered and washed free from acid. The moist filtered material is made into a paste with 170 parts of ice-water, 50 parts of crystallized sodium acetate is added and then a solution of 27.1 parts of 1-(2-aminoethyl)-4,5-dichloropyridazone-6 hydrochloride in 130 parts of water, and the whole is adjusted to pH 6 to 7 by gradual addition of about 60 parts of a 10% aqueous sodium carbonate solution; the mixture is stirred for fifteen to twenty hours at room temperature. The pH value should not be allowed to change during this period. The product is then filtered off, washed with a little water and dried in a stream of air at about 30° to 40° C. A green dye of the formula:

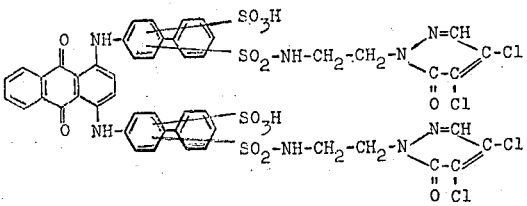

(the exact positions of the sulfonic acid and sulfonamide groups in the diphenyl radicals are not known) is obtained in a good yield. It can be fixed wet fast on cotton by the method described in Example 1.

By the method described in paragraph 1 of this example the dye of the formula:

(25)
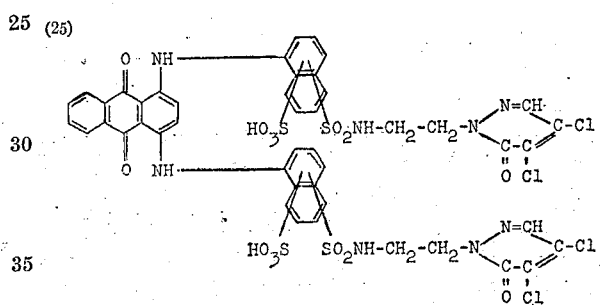

is obtained.

Example 26

19.1 parts of the dye of the formula:

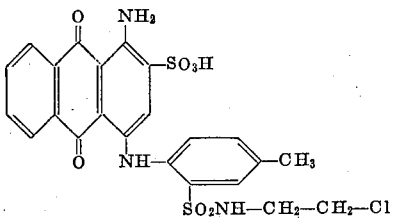

(obtained by reaction of the sulfochlorination product of 1 - amino - 4 - p - toluidinoanthraquinone - 2 - sulfonic acid obtainable according to Example 20 with β-chloroethylamine hydrochloride) is suspended in 300 parts of water at 5° to 10° C. and 13 parts of hydrazine hydrate and 10 parts of 25% caustic soda solution are added. The solution obtained is stirred for twenty hours at room temperature. Then the reaction product is precipitated at room temperature by adding 80 parts of 25% hydrochloric acid and the precipitate is filtered off. The filtered material is suspended in 300 parts of water, adjusted to pH 7 with dilute caustic soda solution and a warm solution of 8.5 parts of mucochloric acid in 50 parts of water is added. The whole is stirred for about half an hour at room temperature, heated within about an hour to 80° to 90° C. and the mixture heated for about three hours at this temperature. During this period, 40 parts of 32% hydrochloric acid is gradually added, the precipitate is filtered off, washed with 10% aqueous sodium chloride solution until the wash water no longer turns Congo paper blue and dried in a weak stream of air under an infrared lamp. A dye identical with the dye of Example 20 is obtained in a good yield:

We claim:

1. A phthalocyanine dye of the formula

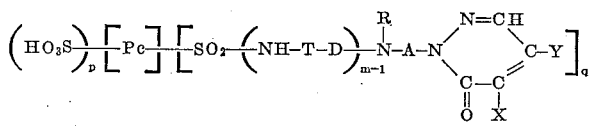

wherein:

Pc represents a radical selected from the class consisting of copper phthalocyanine, monochloro-, dichloro-, trichloro- and tetrachloro-copper phthalocyanine, monophenyl-, diphenyl-, triphenyl- and tetraphenyl-copper phthalocyanine and nickel phthalocyanine;

T represent a divalent radical selected from the class consisting of phenylene, chloro-methyl-phenylene and dichloro-phenylene;

D represents a divalent radical selected from the class consisting of —SO$_2$— and —CO—;

R represents a member selected from the group consisting of hydrogen and lower alkyl;

A represents lower alkylene of 2 to 6 carbon atoms;

X and Y each represents a substituent selected from the group consisting of chlorine and bromine;

$m$ represents an integer of 1 to 2;

$p$ represents a number of from 1 to 4; and $q$ represents a number of from 1 to 3, the sum of $p$ and $q$ being a number of from 3 to 6.

2. The dye of the formula

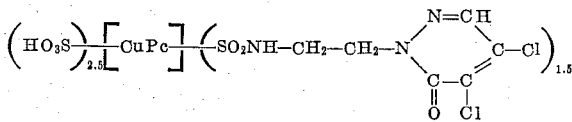

3. The dye of the formula

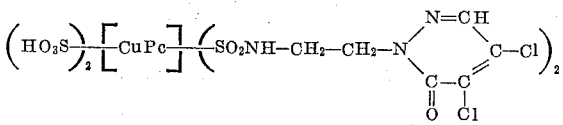

4. The dye of the formula

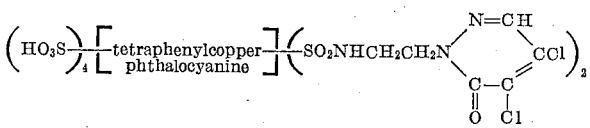

5. The dye of the formula

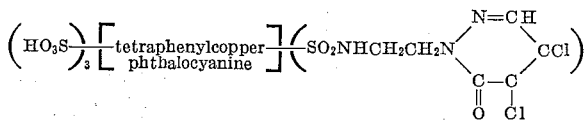

References Cited by the Examiner

UNITED STATES PATENTS

| | | | |
|---|---|---|---|
| 2,842,564 | 7/1958 | Blom et al. | 260—371 |
| 2,938,914 | 5/1960 | Joyce | 260—371 |
| 3,126,369 | 3/1964 | Hensel et al. | 260—154 |
| 3,126,370 | 3/1964 | Hensel et al. | 260—154 |
| 3,126,377 | 3/1964 | Tartter et al. | 260—242 |
| 3,133,059 | 5/1954 | Clark et al. | 260—242 |

OTHER REFERENCES

Lubs, "Chemistry of Synthetic Dyes and Pigments," pages 96, 335–6, 557–9, 607–8 (Reinhold) (1955).

WALTER A. MODANCE, *Primary Examiner.*

LEON ZITVER, NICHOLAS S. RIZZO, *Examiners.*

REYNOLD J. FINNEGAN, ROBERT T. BOND,

*Assistant Examiners.*